J. T. CHADWICK.
NUT LOCK.
APPLICATION FILED NOV. 3, 1908.
916,997.
Patented Apr. 6, 1909.
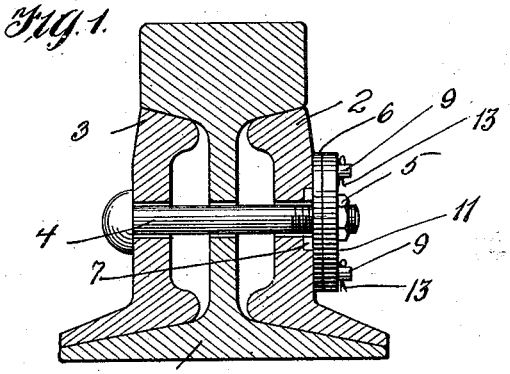
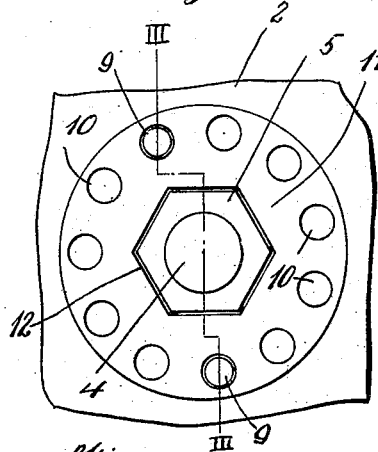
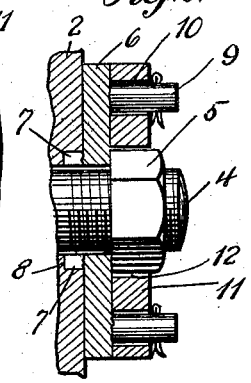
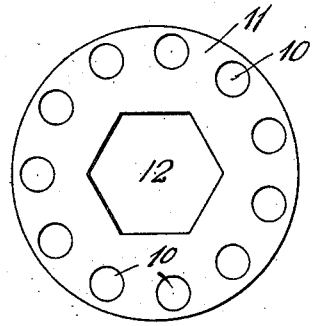
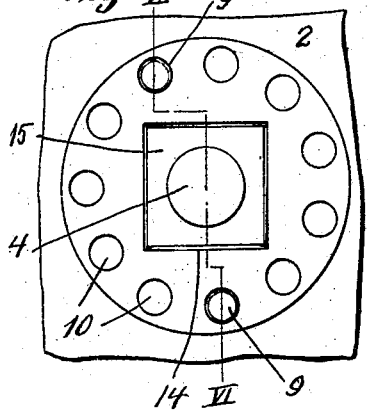
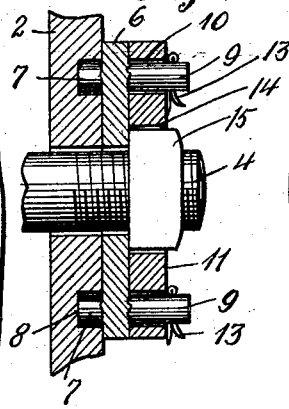
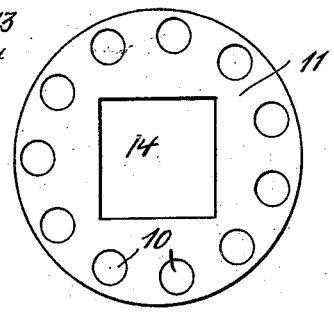
Inventor
J. T. Chadwick
Witnesses
By
Attorneys

UNITED STATES PATENT OFFICE.

JOHN THOMAS CHADWICK, OF REYNOLDSVILLE, PENNSYLVANIA.

NUT-LOCK.

No. 916,997.     Specification of Letters Patent.     Patented April 6, 1909.

Application filed November 3, 1908. Serial No. 460,912.

*To all whom it may concern:*

Be it known that I, JOHN THOMAS CHADWICK, a citizen of the United States of America, residing at Reynoldsville, in the county of Jefferson and State of Pennsylvania, have invented certain new and useful Improvements in Nut-Locks, of which the following is a specification, reference being had therein to the accompanying drawing.

This invention relates to nut locks, and the primary object of my invention is the provision of simple and effective means for locking a nut, whereby the same cannot rotate or become accidentally displaced.

Another object of my invention is to provide a simple and durable nut lock that can be used in connection with the present type of bolt and nut without injuring either.

A further object of this invention is to provide novel means for locking a nut upon a bolt whereby the nut can be easily and quickly unlocked and removed.

A still further object of my invention is to provide a nut lock that can be advantageously used in connection with the splice bars of a rail joint or similar structures subject to vibrations.

With the above and other objects in view, which will readily appear as the invention is better understood, the same consists in the novel construction combination and arrangement of parts, to be presently described and then claimed.

In the drawings, Figure 1 is a side elevation of my nut lock as applied to a hexagon nut used in connection with a rail joint, Fig. 2 is a front elevation of a nut lock, Fig. 3 is an enlarged vertical sectional view of the same taken on the line III—III of Fig. 2 and with the nut and bolt in side elevation, Fig. 4 is a front elevation of a detached locking washer, Fig. 5 is a front elevation of a nut lock as designed for a square nut, Fig. 6 is a vertical sectional view of the same taken on the line VI of Fig. 5 and with the nut and bolt in side elevation, and Fig. 7 is a front elevation of a detached locking washer for a square nut.

In the accompanying drawings, 1 designates a rail having the sides thereof provided with splice bars 2 and 3 connected by a bolt 4 extending through the rail 1, and provided with a hexagon nut 5 for retaining the splice bars in engagement with the rail.

Prior to placing the nut 5 upon the threaded end of the bolt 4, I place a studded inner washer 6 upon the bolt, the rear face of said washer having diametrically opposed lugs or pins 7 adapted to engage in similarly disposed recesses 8 provided therefor in the outer side of the splice bar 2, these lugs preventing the washer 6 from rotating relative to said splice bar.

The outer face of the washer 6 is provided with two lugs 9 arranged adjacent to the peripheral edge of the washer 6 and disposed approximately opposite one another. These studs are adapted to fit in the circumferentially arranged and equally spaced openings 10 provided therefor in the outer locking washer 11 surrounding a nut 5, said washer having a central hexagon shaped opening 12 to accommodate the nut 5. The lugs 7 and 9 are right angularly disposed with respect to the faces of the inner washer 6 and the said lugs 7 and 9 are positioned at points removed from the peripheral edge of the said washer.

After the locking washer 11 is placed over the nut 5 and the studs 9, cotter pins 13 are placed in the ends of the studs 9 to hold the locking washer 11 in engagement with the washer 6 and prevent the nut 5 from rotating.

In Figs. 5 to 7 inclusive, a modification of my invention is illustrated, wherein the lugs 7 are disposed adjacent to the edges of the studded washer 6, and the locking washer 11 is provided with a rectangular opening 14 to fit over a square nut 15.

On account of the many positions a nut of the hexagon or square type might assume upon a bolt, it is necessary that a plurality of the openings 10 be provided and that the studs 9 be positioned as best shown in Figs. 2 and 5.

The washers are circular and of the same diameter.

My nut lock is made of strong and durable metal and can be easily installed without the use of skilled labor.

While in the drawings forming a part of this application there is illustrated the preferred embodiments of my invention, I would have it understood that the details of construction can be varied or changed as to the shape, proportion and manner of assemblage, without departing from the spirit of the invention.

Having now described my invention, what I claim as new, is;—

1. A nut lock comprising a bolt, an inner washer mounted upon the bolt and provided with lugs, said lugs projecting at right angles with respect to the faces of the washer, the lugs positioned at points removed from the peripheral edge of the washer, the lugs upon each face diametrically arranged with respect to each other, the lugs upon the inner face of the washer adapted to extend into an element through which the bolt extends, a nut mounted on the bolt and abutting against said inner washer, an outer washer mounted upon the nut, abutting the inner washer and provided with a circumferentially arranged series of openings, any two openings of said series which are diametrically opposed to each other adapted to receive the lugs projecting from the outer face of the inner washer, and means extending through the lug which projects from the outer face of the inner washer for coupling the outer washer to the inner washer.

2. A nut lock comprising a bolt, an inner washer mounted upon the bolt and provided with lugs, said lugs projecting at right angles with respect to the faces of the washer, the lugs positioned at points removed from the peripheral edge of the washer, the lugs upon each face diametrically arranged with respect to each other, the lugs upon the inner face of the washer adapted to extend into an element through which the bolt extends, a nut mounted on the bolt and abutting against said inner washer, an outer washer mounted upon the nut, abutting the inner washer and provided with a circumferentially arranged series of openings, any two openings of said series which are diametrically opposed to each other adapted to receive the lugs projecting from the outer face of the inner washer, and means extending through the lug which projects from the outer face of the inner washer for coupling the outer washer to the inner washer, each of said washers being circular and of the same diameter.

In testimony whereof I affix my signature in the presence of two witnesses.

JOHN THOMAS CHADWICK.

Witnesses:
WILLIAM ARMITAGE,
THOMAS H. CHADWICK.